Sept. 12, 1939.   M. F. A. JULIEN   2,172,707
RESILIENT COUPLING
Filed June 16, 1937
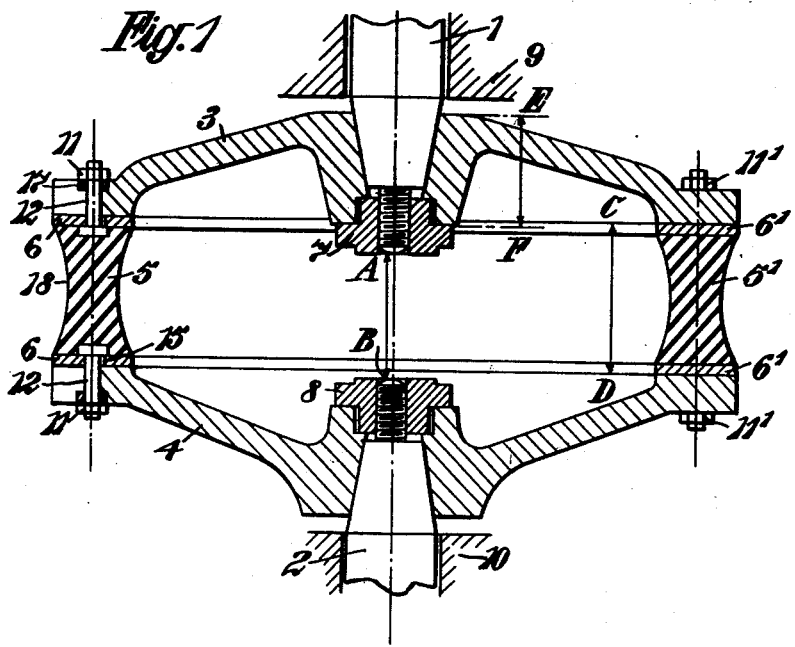
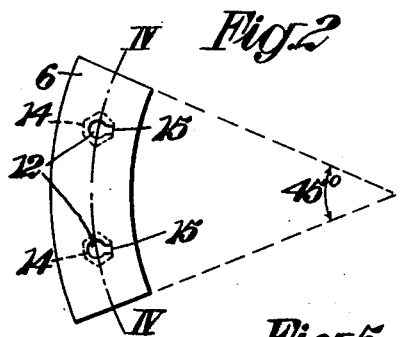
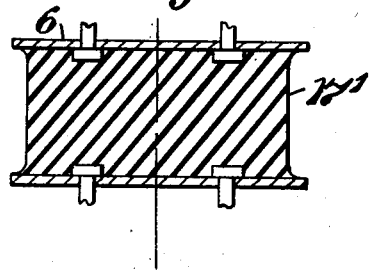
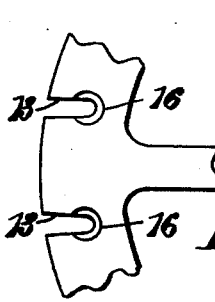
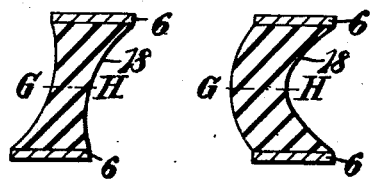

Patented Sept. 12, 1939

2,172,707

UNITED STATES PATENT OFFICE 2,172,707

RESILIENT COUPLING

Maurice François Alexandre Julien, Paris, France

Application June 16, 1937, Serial No. 148,602
In France June 20, 1936

6 Claims. (Cl. 64—11)

This invention relates to a system of coupling or resilient joint intended for the transmission of forces between a driving shaft and a driven shaft placed substantially in alignment but being adapted due to the elasticity of the joint to accommodate certain degrees of freedom or misalignment of the shafts with respect to one another.

Resilient transmissions have already been proposed for this purpose but according to the present invention such a joint is formed in a particularly compact and simple form with provision for adjusting independently the elasticities which oppose different kinds of displacements of the two shafts with respect to one another. For example the relative axial movement of the two shafts; the relative angular displacements of the two shafts and principally the lateral displacement of one shaft with respect to the common axis, whilst permitting adjustment to an optimum degree of the angular elasticity which absorbs the small relative fluctuations in the angular speeds of the shafts.

In carrying the invention into effect according to one convenient mode there is arranged at the adjacent ends of each of the shafts a disc and the peripheral parts of each disc are integrally connected by means of resilient or elastic material formed in one piece or in several parts, and preferably of rubber, or similar material, which adhere to metallic reinforcements preferably plain and situated each in a plane perpendicular to the mean direction of the shafts, each of the said reinforcements being itself secured to one of the corresponding discs.

For the purpose of reducing the overall dimensions, the securing and gripping members of the two discs, each on its respective shaft, are arranged face to face and are consequently inside the free space between the two discs.

Reference will now be made to the accompanying drawing which shows different embodiments of the invention.

Figure 1 shows in longitudinal section along an axis common to the two coupled shafts a resilient joint according to one form of the invention.

Figure 2 shows a plan view of a joint element removed from the discs.

Figure 3 is a view of part of the disc corresponding to the element of Figure 2.

Figure 4 is a section along the line IV—IV of Figure 2.

Figures 5, 6 and 7 are transverse sections of the resilient joint of the shapes they may assume under various working conditions.

In Figure 1 are illustrated two shafts, for example, the driving shaft 1 and the driven shaft 2, the disc 3 being the driving disc and 4 the driven disc. The elastic joint proper is formed by a mass of rubber 5, 5' which adheres to the frames 6, 6'. These frames are fixed to the discs 3 and 4 by bolts 12 with heads embedded in the mass of rubber and locked by nuts 11, 11'.

The outline of the heads of the bolts embedded in the rubber is indicated by dotted lines at 14. Further, each bolt preferably carries a small key 15 which rests in a keyway of the corresponding frame so as to prevent the bolt from turning when the nut 11 is being tightened up.

The ends of the shafts 1 and 2 are tapered and screwthreaded at their ends and nuts 7 and 8 are provided for holding the discs on the shafts. The shafts themselves are supported in bearings 9 and 10.

The method of mounting will vary according to the conditions or particular embodiment of the coupling employed. For instance should there exist only a single elastic element 5, 5', of annular form the securing of this element on each of the discs will only be possible if there is sufficient space between the discs 3 and 4, and removing the necessity of dismounting at least one of the bearings 9 and 10.

It is preferable to use a plurality of elements 5, 5', the assembly of which constitutes the toric form so as to facilitate the mounting and dismounting of the said elements and also providing access to the cavity situated between the two discs should it be desired to tighten or loosen the nuts 7 and 8.

This mounting or dismounting of the elements can also be obtained without having to space the discs 3 and 4 from one another and this is permitted by arranging lateral and parallel slots 13 (Figure 3) provided in the discs 4 which allow of the passage of the screwthreaded rods of the bolts 12 which project outside the frames 6, 6' (Figure 3).

It will be noted that in order to prevent the elements being displaced by centrifugal force upon rotation of the shafts which may be produced in spite of the locking of the nuts 11, a cavity 16 is milled (Figure 3) in the disc which receives a stop washer 17 (Figure 1) thus preventing any outward movement of the corresponding element due to centrifugal force.

The element shown in Figure 2 is in the form of a segment of a circular ring and corresponds to an angle, at the centre, of 45°, should eight of such elements be provided to form the whole joint. A smaller or greater number of elements may be provided according to the size of the coupling employed.

Furthermore each element may have any other form. In particular (according to the view of Figure 2) each element may be given a circular, oval, square, polygonal form, etc., the assembly of the elements being distributed over an annular surface.

Preferably the opposite face of the elements will be concave so as to prevent localization of excessive fatigue in the corners: there is thus provided between the elements a space or clearance 17' (as seen in Figure 4) which is a median circular section of an element.

The elements may be thus be placed so as to space them from one another and to permit or not regular intervals between them.

It is essential in order to ensure a suitable freedom of movement to the joint to observe the following rules of construction:

1. The inner diameter of the annular surface which constitutes the element will be preferably greater than half the outer diameter of the said annular surface.

2. The depth of the element measured by the distance of the two frames will preferably be of the same order as the thickness in the direction of the diameter but preferably greater than the said thickness.

According to the invention the mass of rubber constituting each element will also be given a section such that during its normal work in shear the amount of work of the rubber will be distributed in an approximately equal manner throughout the mass taking account of all the forces which are exerted on it and in particular the centrifugal force which may be considerable in certain instances. The section of the mass of rubber will thus be less at the centre as is seen at 18 in Figure 1 and in Figure 5 which shows a section of an element in the position of rest. The thickness in the direction G—H is in particular less than that in contact with the frames.

In Figure 6 the joint is shown under conditions of shear and where the two shafts set off with respect to one another, the amount of local work in the mass is higher in the part of less thickness as indicated by G—H.

A similar case occurs when transmission produces a relative tangential movement of the two opposite frames on each of the two discs.

In Figure 7, on the other hand, the joint works only under the action of centrifugal force. It is clear that the latter produces shearing forces only in the region near the frames and not in the region removed from G—H. Thus when the joint operates while rotating, the centrifugal force added to the mechanical working forces transmitted, from one shaft to the other, results in a certain constriction of the region G—H and permits a balance to be obtained in the median region, and near the frames, of the tensions in the rubber, the latter then working under the best conditions. This form of section which is such that it moves, while becoming constricted, from the frames up to the median part, also constitutes a feature of the invention.

It is clear that if modifications are made such as in the thickness of the rubber joints, their width, their number, and also by modifying them by perforations or by laminations as disclosed in the French Patent No. P. V. R. 400,681 of the same inventor which relates to elastic supports of adhesive rubber it is possible to adjust at will the response of the rubber and the elastic joint for the different relative displacements which may be given to the coupled shafts.

Naturally the invention is not limited to the embodiment described which is given only by way of example, and it is applicable, on the other hand, to the use of any kind of elastic joint with any manner of securing to the coupling discs.

I claim:

1. A coupling comprising two members mounted on driving and driven elements, axially extending elastic material extending between said members, said elastic material comprising separate elements, frame means adhering to said material, said frame means being removably secured to the coupling members.

2. A coupling comprising discs mounted on driving and driven elements, elastic material extending axially between said discs, said elastic material comprising separate elements adhesively connected to frame means, and means detachably connecting said elastic material and said frame means to said discs.

3. A coupling comprising discs mounted on driving and driven elements, elastic material extending axially between said discs, said elastic material comprising separate elements adhesively connected to frame means, and bolts having heads embedded in the elastic material, each of said bolts being provided with a locking member.

4. A coupling comprising discs mounted on driving and driven elements, elastic material extending axially between said discs, said elastic material comprising separate elements adhesively connected to frame means, and bolts having heads embedded in the elastic material, each of said bolts being provided with a locking member and radially extending slots in the discs for the passage of said bolts.

5. A coupling comprising axially separated members mounted upon driving and driven elements, an integral body of elastic material of annular form extending between said driving and driven elements, said elastic material having parallel end faces connected to said driving and driven elements, and curvilinear side faces converging towards a median region and providing a thickness which is less than the thickness at the region of attachment to said driving and driven elements.

6. A coupling comprising axially separated members mounted upon driving and driven elements, said driving and driven elements having parallel end faces at right angles to their axis of rotation, a homogenous body of elastic material extending longitudinally between said driving and driven elements, and adhesively connected to said end faces and having a median region which is of less thickness than at the region of attachment.

MAURICE FRANÇOIS ALEXANDRE JULIEN.